US007646812B2

(12) United States Patent
Ludvig et al.

(10) Patent No.: US 7,646,812 B2
(45) Date of Patent: Jan. 12, 2010

(54) SPECIAL PREDICTIVE PICTURE ENCODING USING COLOR KEY IN SOURCE CONTENT

(75) Inventors: Edward A. Ludvig, Redwood City, CA (US); Jack T. Lee, Bellevue, WA (US); John P. Comito, Redwood City, CA (US)

(73) Assignee: Microsoft Corporation, Redmond, WA (US)

( * ) Notice: Subject to any disclaimer, the term of this patent is extended or adjusted under 35 U.S.C. 154(b) by 1043 days.

(21) Appl. No.: 11/098,023

(22) Filed: Apr. 1, 2005

(65) Prior Publication Data

US 2006/0222076 A1    Oct. 5, 2006

(51) Int. Cl.
*H04B 1/66* (2006.01)
(52) U.S. Cl. .............................. 375/240.16; 375/240.13; 375/240.15; 375/240.14; 375/240.12; 375/240.24; 382/238; 382/236; 382/232
(58) Field of Classification Search ............ 375/240.16, 375/240.13, 240.15, 240.14, 240.12, 240.24; 382/238, 236, 232
See application file for complete search history.

(56) References Cited

U.S. PATENT DOCUMENTS 4,914,508 A *  4/1990  Music et al. ........... 375/240.01
5,083,860 A *  1/1992  Miyatake et al. ............ 352/129
5,832,234 A * 11/1998  Iverson et al. ............... 709/247

OTHER PUBLICATIONS

"MPEG-2," from Wikipedia, the free encyclopedia, available at <<http://en.wikipedia.org/wiki/MPEG-2>>, accessed on Nov. 8, 2005, 6 pages.
Motorola homepage provided by Motorola, Inc. of Schaumburg, IL, available at << http://www.motorola.com/>>, accessed on Nov. 8, 2005, 1 page.
"Answers to Common Interactive Television (ITV) Questions," available at <<http://www.itvdictionary.com/set-top_box.html>>, accessed on Nov. 8, 2005, 6 pages.
"SeaChange MPEG Encoder (Beowulf II)," provided by SeaChange International of Maynard, MA, available at <<http://www.schange.com/Downloads/Broadcast/Beowulf-IIQS.pdf>>, accessed on Nov. 8, 2005, 1 page.

(Continued)

*Primary Examiner*—Shawn An
(74) *Attorney, Agent, or Firm*—Lee & Hayes, PLLC

(57) ABSTRACT

Encoding functionality is described for producing encoded intra (I) pictures and predictive (P) pictures for consumption by an application running on a set-top box. The encoding functionality includes a pre-processing module which marks regions that should not be updated with a predetermined color code. An encoding module receives the output of the pre-processing module, and, in the event that the output contains the predetermined color code, produces a predictive (P) picture. In the predictive (P) picture, the encoding module produces macroblocks having zero motion vector and zero difference (or skipped macroblocks) corresponding to regions that were marked by the pre-processing module with the predetermined color code. The encoding module produces intra macroblocks for other regions of the picture (corresponding to update regions).

17 Claims, 10 Drawing Sheets

OTHER PUBLICATIONS

"Ligos and SeaChange International Partner to Co-develop New MPEG Transcoding Technology," press release, Apr. 3, 2003, available at <<http://www.ligos.com/company_press_040303.htm>>, accessed on Nov. 8, 2005, 2 pages.

SeaChange homepage provided by SeaChange International of Maynard, MA, available at <<http://www.seachangeinternational.com/contact_info.asp>>, accessed on Nov. 8, 2005, 1 page.

OpenTV homepage provided by OpenTV, Corp. of San Francisco, CA, available at <<http://www.opentv.com/about/offices.html>>, accessed on Nov. 8, 2005, 1 page.

"OpenTV Frame," provided by OpenTV, Corp. of San Francisco, CA, available at <<http://www.opentv.com/files/OpenTV_Frame_Data_Sheet_april_2005.pdf>>, accessed on Nov. 8, 2005, 2 pages.

* cited by examiner

SPECIAL PREDICTIVE PICTURE ENCODING USING COLOR KEY IN SOURCE CONTENT

TECHNICAL FIELD

This subject matter relates to strategies for encoding images. In a more specific implementation, this subject matter relates to strategies for encoding images for consumption by a set-top box.

BACKGROUND

Set-top boxes receive media information from a source (such as a head-end distribution site), process the media information, and present the processed media information on an output device (such as a conventional television unit). In addition to rendering a conventional stream of media information (e.g., from a conventional broadcast), some set-top boxes also include provisions for presenting static images. For example, some set-top boxes can receive the static image on an in-band or out-of-band channel and store the image in memory (e.g., RAM memory). A decoder can take the image from memory and decode it for presentation on the television unit.

A better understanding of the nature of image processing in set-top box environments can be gained through the following introductory information regarding the nature of exemplary image coding standards. Consider, for example, the MPEG-2 standard (where MPEG is an acronym for "Moving Pictures Experts Group"), as fully described in the international standard ISO/IEC 13818-2. FIG. 1 presents salient features of the MPEG-2 standard. As shown there, the MPEG-2 standard defines image content in a hierarchy of units. The most encompassing such unit comprises a video sequence, demarcated by a sequence header and an end-of-sequence code. A sequence can include one or more groups of picture (GOPs). FIG. 1 shows one exemplary GOP 102. The GOP 102, in turn, can comprise one or more pictures. FIG. 2 shows a series of pictures, including exemplary picture 104. The picture 104, in turn, is composed of a plurality of slices. FIG. 1 shows an exemplary slice 104 within picture 104. A slice can span the entire length of the picture 104, or the entire length of a picture can comprise multiple slices in series. The use of slices accommodates efficient error processing. Namely, if a decoder encounters a slice containing an error, the decoder can limit the effects of the error to the slice. (However, each slice has a header, which adds overhead to the encoded image, so there is a tradeoff between increasing the number of slices to ensure satisfactory error-processing performance and decreasing the number of slices so as not to unduly burden the decoder with too much overhead data.) Finally, the slice 106 can comprise multiple macroblocks. FIG. 1 shows one exemplary macroblock 108. The macroblock 108 includes a 2×2 array of 8×8 image blocks. The image content in the pictures is processed using a combination of discrete cosine transform (DCT) processing, quantization, and run-length encoding.

The MPEG-2 standard includes different types of pictures, including an intra (I) picture, a predictive (P) picture, and a bi-directional (B) picture. I pictures correspond to image content with sufficient information to be decoded without reference to other neighboring pictures. P pictures contain information which allows a decoder to decode their content with reference to a previous picture in a stream of pictures. And B pictures contain information which allows a decoder to decode their content with reference to a previous picture or a subsequent picture. Thus, the B and P pictures generally comprise difference pictures, because they encode their content with reference to other pictures, by expressing how these B and P pictures differ from other pictures. FIG. 1 shows a stream of pictures in the GOP 102, including an exemplary I picture 110, an exemplary B picture 112, and an exemplary P picture 114.

Consider the exemplary case of the P picture 114. This picture can be coded with reference to a previous picture, such as the previous I picture 110 (constituting a reference picture). Namely, for a given macroblock under consideration, the encoder will attempt to determine if the image information in this macroblock is related to counterpart image information in the reference picture. If this is so, then the encoder can encode this macroblock by determining a motion vector (MV) which describes how the image information in the macroblock has moved relative to its counterpart information in the reference picture. The encoder can also encode the macroblock by determining difference information which describes how the image information in the macroblock has changed (in content) relative to its counterpart information in the reference picture. If the image information has not changed relative to the reference picture, the encoder can encode the macroblock using zero motion vector and zero difference. Alternatively, in some cases, the encoder can determine that a large portion (such as a slice) of the picture is unchanged. More specifically, if a slice contains two or more zero motion vector macroblocks, the encoder can encode the slice as containing "skipped macroblocks." However, if the encoder cannot trace the image information in the macroblock under consideration to counterpart image information in the reference picture, then it will encode that macroblock as an intra (I) macroblock.

Upon receipt of the encoded content, the decoder will decode a P picture in a manner depending on how its constituent macroblocks have been encoded. For example, the decoder will decode a macroblock with non-zero MV and non-zero difference information by modifying the image content in a previous picture. The decoder will decode a macroblock containing zero MV and zero difference information by simply repeating the image content taken from a previous picture. In a similar manner, the decoder will decode a macroblock within a skipped macroblock region by simply repeating the image content taken from a previous picture. Finally, the decoder will decode an intra macroblock using only image information contained in the macroblock itself, that is, without reference to any previous picture.

With this introduction, a set-top box can receive MPEG pictures (or pictures coded accorded to some other standard) and present the pictures in conjunction with an application running on the set-top box. More specifically, an application can rely on the pictures as image resources, where different states in the execution of the application can call on different image resources. The set-top box functionality devoted to presenting video components is referred to as the video layer. The set-top box can also "overlay" graphics information on top of the video information (such as a cursor, various controls, etc.). The set-top box functionality devoted to presenting the graphics information is referred to as a graphics layer, also referred to as an on-screen display (OSD) layer.

However, according to one design challenge, bandwidth is typically a scarce commodity in set-top box environments. For example, an application which references a series of application pages containing different combinations of video components can simply request a new I picture when the user invokes each new application page. However, as appreciated by the present inventors, over-use of I pictures to transmit image information can overwhelm the limited bandwidth resources of the set-top box. This approach can also overwhelm the memory resources of the set-top box (and/or possibly other resources of the set-top box).

As another design challenge, many set-top boxes provide various constraints regarding the kinds of image content that can be received and processed. For example, some kinds of set-top boxes only accept I pictures and certain types of difference pictures. Thus, an effort to reduce bandwidth must also work within the technical constraints of specific set-top box environments.

There therefore exists a general need in the art to present image and video content in different set-top box environments in a resource-efficient manner.

SUMMARY

According to one exemplary implementation, a method is described for producing encoded images for use by a receiving device. The method includes: (a) providing an intermediate image; and (b) producing an encoded image from the intermediate image by: (b1) encoding regions of the intermediate image that are marked with a predetermined key code as non-update regions (e.g., as non-update macroblocks); and (b2) encoding regions of the intermediate image that are not marked with the predetermined key code as update regions (e.g., as update macroblocks).

Additional exemplary implementations are described in the following.

Figure 1:
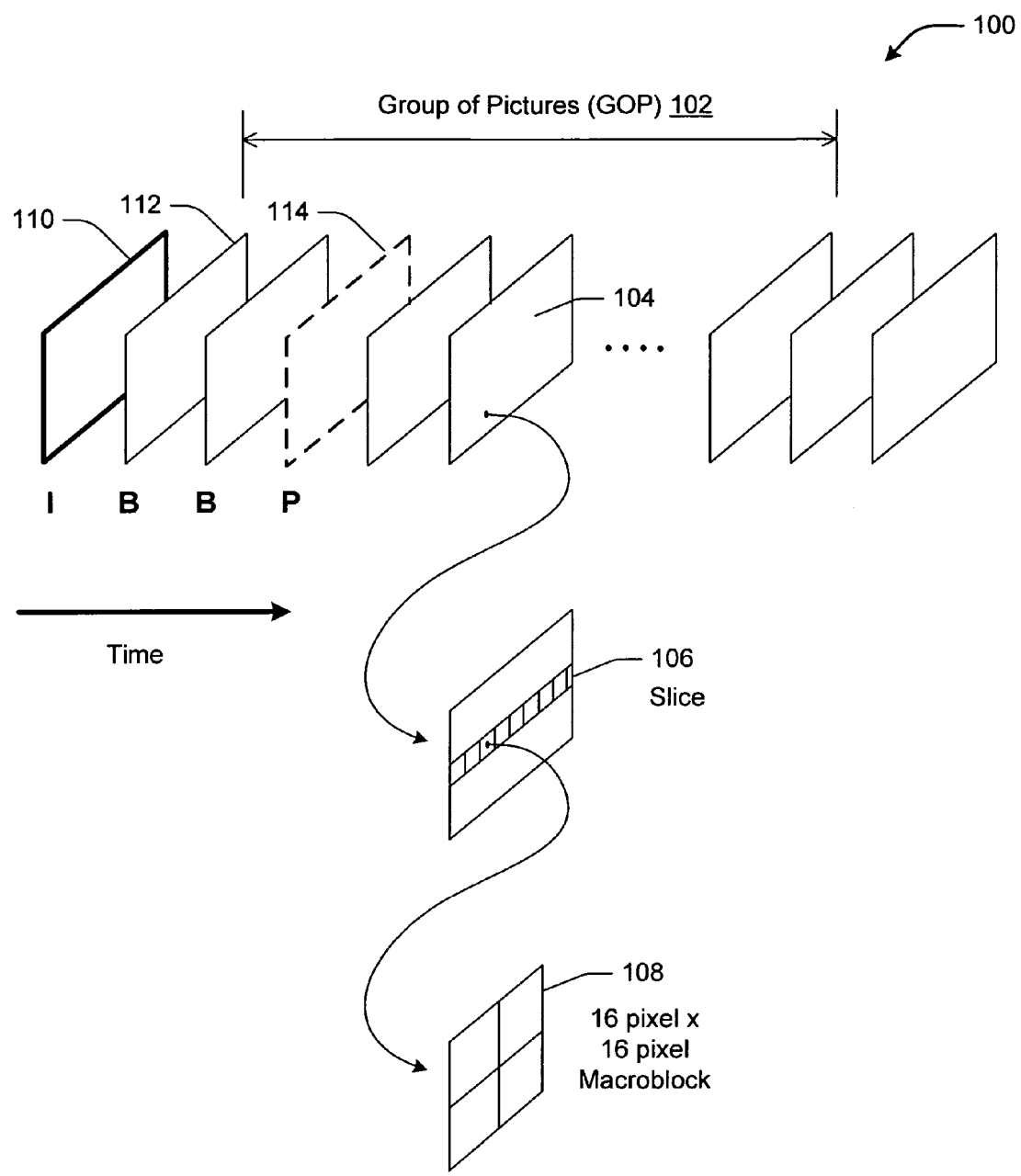
FIG. 1 shows an overview of known MPEG-2 coding features.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

The following description sets forth special encoding functionality for encoding image information for consumption by a set-top box (or other recipient device). The encoding functionality can produce an encoded image containing update regions and non-update regions for a predictive (P) picture (and only updated regions for an intra (I) picture). For the P picture, the update regions are coded as intra macroblocks, while the non-update regions are coded as either zero motion vector (MV) and zero difference macroblocks or "skipped" macroblocks. (Zero MV and zero difference macroblocks are referred to as zero MV&diff macroblocks for brevity in the following explanation.)

According to another exemplary feature, the encoding functionality can comprise a pre-processing module followed by an encoding module. The pre-processing module accepts a source image used to constitute the encoded image. For a P picture, the pre-processing module also accepts control parameters that determine how the source image is to be positioned and scaled within the encoded image. The pre-processing module then produces an intermediate image containing the source image positioned and scaled in a manner determined by the control parameters. The source image corresponds to the update region, while the remainder of the intermediate image corresponds to the non-update region. For a P picture, the pre-processing module produces a predetermined non-update code in the non-update region of the intermediate image (such as a non-permitted color code, e.g., in the RGB space, the super green color 00, FF, 00). This operation is referred to as color keying.

The encoding module receives the intermediate image and examines this image for the presence of the predetermined non-update code. If the intermediate image contains no non-update code, then the encoding module will code the entire image as an I picture. If the image contains the non-update code, then the encoding module will code the image as a P picture. More specifically, for a P picture, the encoding module will code regions that contain the non-update code as non-update regions, and will code regions that lack the non-update code as update regions. Thus, the predetermined non-update code serves as a key which allows the encoding module to unambiguously determine the spatial layout of the non-update regions.

The above-discussion pertains to the use of the encoding functionality in a real-time encoding mode. In this mode, the encoding functionality can dynamically construct encoded images when the images are needed by a consuming application being run on the set-top box.

In another mode, a developer (or other individual) can manually enumerate all of the permutations of encoded content that an application might use. The developer can then produce a "pre-canned" library of encoded images that can be accessed by the consuming application (that is, without having to construct the encoded images from scratch in the manner described above using the pre-processing module). Still another mode can use a combination of the real-time processing and the pre-canned processing. For example, a developer may wish to provide pre-calculated encoded content for particularly popular application pages, and rely on dynamic processing for other, less frequently used, application pages.

In use, the encoding functionality first provides an I picture to a decoding module. The I picture, for example, may provide a background image that serves as a backdrop or as "wallpaper" for subsequent images that are overlaid on top of it. Then the encoding functionality provides a P picture, containing the above-described update regions and non-update regions. The decoding module interprets the non-update regions as an instruction to re-render the background image content from the previously received I picture (meaning that the decoding module presents no "new" information). The decoding module, however, will update the region of the display corresponding to the update regions with new information provided in the P picture. This operation has the effect of overlaying the image content contained in the update regions of the P picture on top of the background image. Additional P pictures can be subsequently presented to the decoding module to provide incremental updates to a presentation; for instance, this may have the effect of updating a picture-in-picture (PIP) presentation upon receipt of each P picture (leaving the remainder of the presentation unmodified).

The above-described strategy confers a number of benefits. For example, the strategy provides a bandwidth-efficient technique for providing encoded image content to the set-top box. This is because the encoding provides a convenient technique for eliminating the transmission of redundant information in an application page (e.g., by only transmitting update regions, and by clearly flagging the remaining portions as non-update regions). The strategy also provides an effective and efficient technique for providing image content that conforms to the requirements of certain types of set-top boxes, such as exemplary set-top boxes which accept I pictures or difference pictures having only I macroblocks and/or zero MV&diff macroblocks.

Additional features and attendant benefits of the strategies will be set forth in this description.

At the outset, it should be noted that certain specific examples are provided herein to facilitate explanation, but the described principles have more general application. For instance, this disclosure sets forth certain implementations in which a set-top box processes I pictures and zero MV&diff P pictures. However, more generally, the invention applies to any set-top box environment which receives key picture information followed by difference picture information (but where the difference picture information excludes difference-related content). Moreover, while the MPEG-2 specification is featured in this disclosure to provide concrete examples, the principles described herein can be applied to any image coding format.

Further, this disclosure sets forth examples primarily in the field of set-top boxes. However, more generally, the invention also applies to other image processing environments, such as the processing of image information by a personal computer, or other image-receiving devices.

Further, certain implementations described herein find optimal use in environments that place various constraints on the type of image content that can be received. But the invention also finds use in any image processing environment, including environments that do not place constraints on the kinds of image content that can be received.

As to terminology, the term "image information" and "image content" refer to any kind of data that can be represented in electronic form for consumption by a user. The image information can include still picture resources (e.g., digital photographs, graphics content, solid color block tiles, pattern tiles, etc.), moving picture resources (e.g., audiovisual material, short video vignette loops, etc.), and so on. The term "image" and "picture" refers to a particular unit of image information.

There term "source image" refers to image content that represents the raw image information fed to the encoding functionality, e.g., providing either an I picture or an update region of a P picture.

The term "intermediate image" refers to an image produced by the above-described pre-processing module, or some other kind of processing module. This pre-processing module tags regions that are not to be updated with the special non-update code.

The term "encoded image" refers to an image produced by the above-described encoding module.

The term "update region" corresponds to portions of the encoded image (or the intermediate image) which contain information that a decoding module will use to update a video presentation.

The term "non-update region" corresponds to portions of the encoded image (or the intermediate image) which contain no information that a decoding module will use to update the video presentation.

As noted above, the term "zero Mv&diff macroblocks" refers to macroblocks having zero motion vector and zero difference information.

The term "intra" has specific meaning within the MPEG environment, but is intended here to generally represent any information developed in the context of any standard that can be decoded without reference to temporally neighboring image content. As used herein, a synonym for "intra" information is "anchor" information. Similarly, the term "predictive" information has a specific meaning in the MPEG environment, but is intended here to generally represent any information developed in the context of any standard that is conventionally decoded with reference to neighboring image content (although it need not be, because, for example, a P picture can include all intra macroblocks). As used herein, a synonym for "predictive" information is any kind of "difference" information.

This disclosure includes the following sections.
A. Structural Features (FIGS. 2 and 3)
A.1. The System
A.2. The Set-top Box
A.3. The Encoding Functionality
B. Exemplary User Interface Presentations and Associated Image Content (FIGS. 4-7)
C. Exemplary Method of Operation (FIG. 8-10)
C.1. Pre-Processing to Produce an Intermediate Image
C.2. Encoding the Intermediate Image
C.3. Consumption of Encoded Images
A. Structural Features (FIGS. 2 and 3)

Generally, any of the functions described with reference to the figures can be implemented using software, firmware (e.g., fixed logic circuitry), manual processing, or a combination of these implementations. The term "logic, "module" or "functionality" as used herein generally represents software, firmware, or a combination of software and firmware. For instance, in the case of a software implementation, the term "logic," "module," or "functionality" represents program code (and/or declarative-type instructions) that performs specified tasks when executed on a processing device or devices (e.g., CPU or CPUs). The program code can be stored in one or more computer readable memory devices. More generally, the illustrated separation of logic, modules and functionality into distinct units may reflect an actual physical grouping and allocation of such software and/or hardware, or can correspond to a conceptual allocation of different tasks performed by a single software program and/or hardware unit. The illustrated logic, modules and functionality can be located at a single site (e.g., as implemented by a processing device), or can be distributed over plural locations.

A.1. The System

Figure 2:
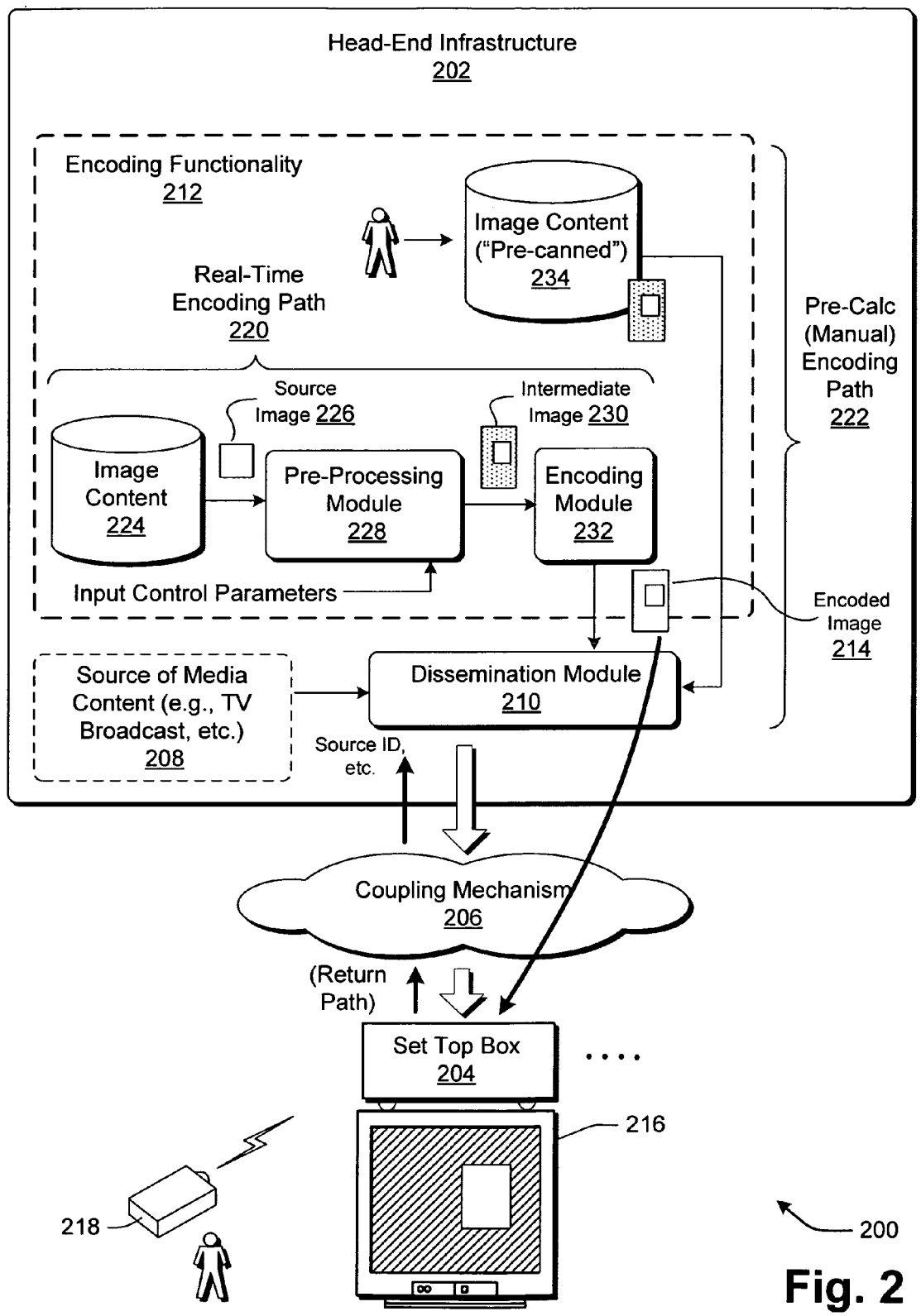
FIG. 2 shows an exemplary system which incorporates unique encoding functionality according to the present invention.
Figure 3:
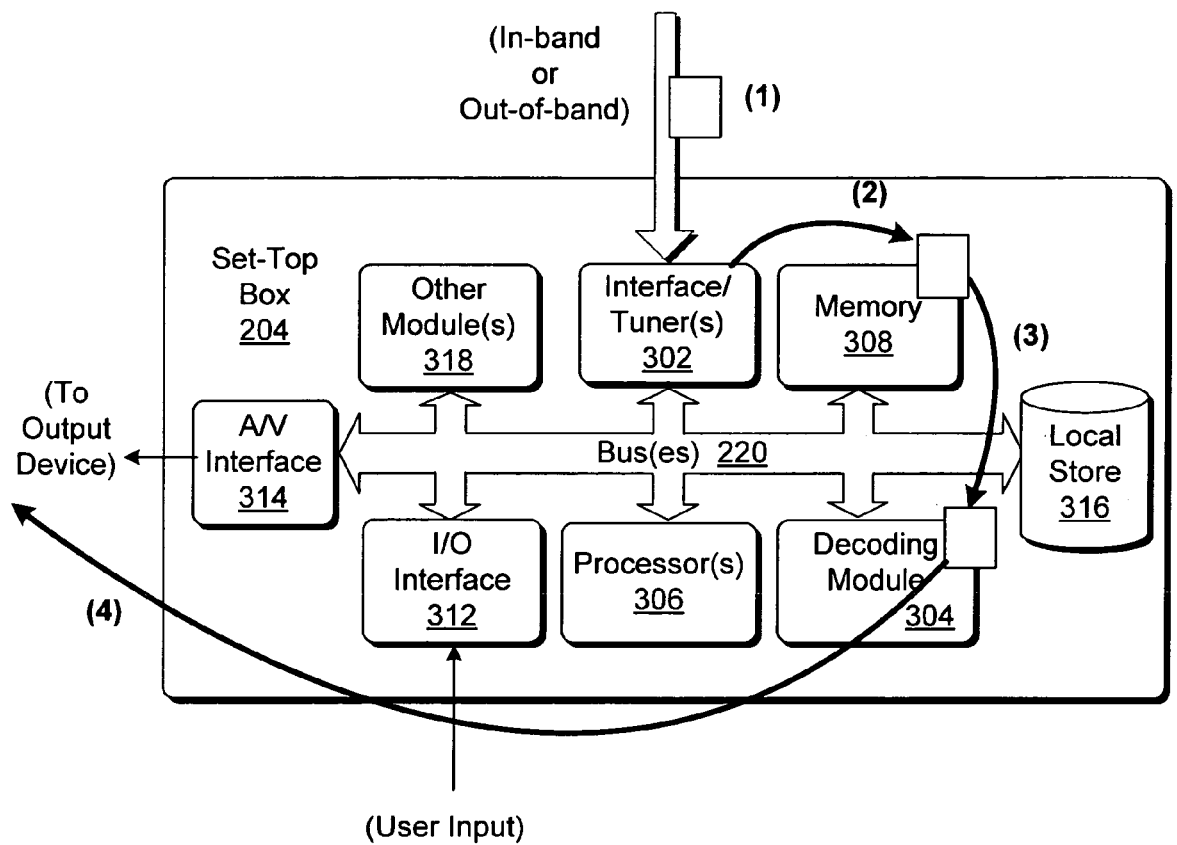
FIG. 3 shows an exemplary set-top box for use in the system of FIG. 2.

FIG. 2 shows an overview of a system 200 in which the improved encoding functionality described herein can be deployed. By way of overview, the system 200 includes head-end infrastructure 202 for providing media information to a plurality of set top boxes (one of which is shown as set top box 204) via a coupling mechanism 206.

The head-end infrastructure 202 can represent any combination of functionality for delivering media information to recipients. For example, the head-end infrastructure 202 can include a source 208 for delivering television programs, on-demand movies, and other resources to the recipients via a dissemination module 210. This functionality (208, 210) may represent conventional cable media distribution infrastructure, conventional wireless media distribution infrastructure (such as satellite media distribution infrastructure), and so forth. Or this functionality (208, 210) may represent a network source of media information that delivers the media information via one or more digital networks. In any event, this functionality (208, 210) can delivery media content to recipients in conventional fashion according to a fixed time schedule, or in an on-demand fashion.

The head-end infrastructure 202 can also include encoding functionality 212 for encoding image content in the unique manner described herein. Encoded image content 214 produced by the encoding functionality 212 may represent a series of static images, or may represent a motion video vignette. The motion video vignette can be decoded and presented by the set-top box 204 as a video loop (e.g., by repeatedly presenting the short vignette). However, to facilitate and simplify discussion, most of the examples provided below will feature the encoding of static image content.

In one case, the head-end infrastructure 202 can package the encoded content 214 along with media information provided by the source 208. This corresponds to an in-band mode. Here, the encoded content 214 is sent in the same "channel" as the other media information (such as a television program or movie). In this case, the set-top box 204 can receive both the encoded content 214 and the media information by tuning to that single channel. In another case, the head-end infrastructure 202 can send the encoded content 214 in a separate channel than the media information provided by the source 208. This corresponds to an "out-of-band" mode. Here, the set-top box 204 can receive the encoded content 214 by tuning to a first channel, and can receive the media information by tuning to a second channel.

The logic and equipment in the head-end infrastructure 202 can be distributed among different sites in any fashion. In one case, the source of media content 208 can be provided at the same location as the encoding functionality 212. In another case, the source of media content 208 and the encoding functionality 212 can be provided at different physical sites. In yet another case, the logic and equipment in the head-end infrastructure 202 need not even be remote from the receiving set-top box 204.

The coupling mechanism 206 couples the head-end infrastructure 202 to the set-top boxes (including representative set-top box 204). This coupling mechanism 206 can be implemented in different ways to suit different technical and commercial environments. For instance, the coupling mechanism 206 can include any kind of conventional distribution infrastructure, such as cable routing infrastructure, satellite routing infrastructure, terrestrial antenna routing infrastructure, and so forth (as well as any combination of such routing infrastructures). Or the coupling mechanism 206 can include a digital network (or combination of networks), such as a wide area network (e.g., the Internet), an intranet, and so forth. In the case where Digital Subscriber Line (DSL) infrastructure is used to disseminate information, the coupling mechanism 206 can utilize the services, in part, of telephone coupling infrastructure.

For the illustrative purposes of this description, the simplifying assumption will be made that the head-end infrastructure 202 and coupling mechanism 206 provide cable or wireless delivery of media information to the receiving set-top box 204. The link between the head-end infrastructure 202 and the set-top box 204 can be implemented as a one-way link (where information flows only from the head-end infrastructure 202 to the set-top boxes), or preferably as a two-way link (where the users of the set-top boxes and applications run by the users can also send data to the head-end infrastructure 202). In the case in which two-way communication is used, the device-to-head-end link can be implemented by the same mechanism that the set-top box 204 uses to receive media information from the head-end infrastructure 202, or by a different mechanism.

The receiving devices include the representative set-top box 204. The set-top box 204 receives media information and encoded image content 214 from the head-end infrastructure 202, performs various processing on the received information (such as decoding the media information and potentially decompressing it), and forwards the processed information to an output device. The output device can correspond to a television unit 216. In one case, the set-top box 204 can be implemented as a separate unit from the television unit 216, and it can connect to the television unit 216 unit via any kind of coupling mechanism (e.g., physical wiring, wireless coupling, and so forth). In another case, the set-top box 204 can be implemented as an integral unit within the television unit 216.

In still other cases, the output device that receives media information from the set-top box 204 can comprise another kind of display device besides a conventional television (such as a computer monitor), and so forth.

The set-top box 204 includes functionality which can present user interface presentations on a display surface of the television unit 216. More specifically, a video layer of the set-top box 204 can produce composite video content within the user interface presentations. A graphics (OSD) layer of the set-top box 204 can produce graphics content which is "overlaid" on top of the video content (as will be described with reference to FIG. 4 below). A user can interact with the user interface presentations via a remote control device 218, or some other kind of input device.

The remaining features of FIG. 2 (e.g., with respect to the encoding functionality 212) will be addressed in Section A.3 (below).

A.2. The Set-top Box

FIG. 3 shows the composition of the exemplary set-top box 204. The set-top box 204 can include a number of modules for performing its ascribed tasks, identified below. In terms of physical implementation, the set-top box hardware can be furnished by Motorola Inc., or any other provider.

To begin with, the set-top box can include an interface module 302. The interface module 302 can represent any functionality for receiving media information and encoded content 214 from the head-end infrastructure 202 using any coupling mechanism. For example, the interface module 302 can simply represent a cable input, an antenna input, or other type of input. Or the interface module 302 can include processing components, such as a DSL modem, a cable modem, a wireless network interface, an Ethernet NIC, or other kind of network interface equipment.

The set-top box 204 can also include receiving functionality, comprising a tuning mechanism and a decoding module 304. The tuning mechanism tunes to one or more channels of information. In a conventional case, the tuning mechanism can comprise one or more physical tuners for tuning to one or more channels of broadcast media information (which may be modulated at prescribed physical frequencies). In another case, the tuning mechanism can correspond to a virtual tuner for tuning to one or more virtual channels of information. The virtual tuner, for example, can connect to different sources of media information delivered over a digital network by "tuning" to a unicast source of such information, a multicast source of source information, or a hybrid unicast/multicast source of such information. The decoding module 304 performs any kind of initial processing on the received media information that has been tuned to, such as decompressing and demultiplexing the media information, A/V-decoding the media information, and so forth. In the context of the present invention, the decoding module 304 is also tasked with the specific responsibility of decoding the encoded content 214 produced by the encoding functionality 212.

The set-top box 204 can include one or more processors 306 for executing instructions to implement the functionality of the set-top box 204.

The set-top box 204 can include memory 308 (such as RAM memory, flash memory, etc.). A portion of the memory 308 can comprise a FIFO-type buffer (not shown) for storing media information prior to the information being decoded. In the context of the present invention, the memory 308 also can store encoded image information 214 prior to it being decoded by the decoding module 304.

The set-top box 204 can include an I/O interface 312 for interacting with the user via one or more input devices (e.g., a remote controller 218, and so forth).

The set-top box 204 can include an A/V interface module 314 for providing media information in an appropriate format to the television unit 216 (or other output device).

The set-top box 204 can include an optional local store 316 for storing any kind of data and/or program information.

The set-top box 204 can include various other modules 318, not specifically enumerated in the figure. For instance, the set-top box 204 can include a graphics compositor for combining video information received from the decoding module 304 with graphics information. The graphics information may comprise various user interface presentations which are overlaid on the video information.

Finally, the set-top box 204 can include one or more buses 320 for coupling the above-identified components together.

FIG. 3 also illustrates an exemplary processing path that can be used to decode received encoded content 214 (from the encoding functionality 212). As described, in one mode, the set-top box 204 can receive the encoded content 214 in an in-band channel. In this mode, the head-end infrastructure 202 sends the encoded content 214 along with the media information in the same channel. In another mode, the set-top box 204 can receive the encoded content 214 in an out-of-band channel. In this mode, the head-end infrastructure 202 can send the encoded content 214 in a first channel and the media information (from the source 208) in a second channel.

Upon receipt, the set-top box 204 can transfer the encoded image content 214 to the memory 308. An application running on the set-top box 204 can load the decoding module 304 with the encoded content 214 that it obtains from the memory 308, whereupon the decoding module 304 can decode it for presentation on the television unit 216.

The encoded content 214 can be used by various applications that run on the set top box 204. Exemplary applications include merchandising applications (where the user purchases goods or services via appropriately configured user interface presentations), voting applications (where the user enters feedback pertaining to an ongoing media presentation program, such as a talent contest, game show, etc.), a video-on-demand (VOD) application (where the user browses through and selects video-on-demand assets), a game application, and so forth. The code that implements the application can be provided locally by the set-top box, provided remotely by the head-end infrastructure 202, or provided at both the local site and a remote site in a distributed fashion.

In any event, an application may reference the content 214 at various junctures in the application. For example, consider the case of a game application. The game application may provide different static image backgrounds when the user advances to different respective levels of the game. Or consider the case of a VOD application. The VOD application can present static images in picture-in-picture (PIP) displays that present jacket art describing the video assets. When the user browses through different collections of VOD assets, this will trigger the VOD application to retrieve appropriate jacket art which describes these assets. As will be described, an application can identify an encoded content resource by providing a corresponding ID to the encoding functionality 212.

A.3. The Encoding Infrastructure

Returning to FIG. 2, this figure outlines exemplary components of the encoding functionality 212. The encoding functionality 212 can function in at least two modes. A first path 220 provides the encoded content 214 in a real-time mode. In this path 220, the encoding functionality 212 produces the encoded content 214 in dynamic fashion when an application on the set-top box 204 requires the encoded content 214. A second "prec-calculated" path 222 computes the encoded content 214 in advance of the user's request for this information. The following discussion will first explain the dynamic mode corresponding to the real-time path 220

The real-time encoding path 220 includes an image content store 224 for storing sources images (such as source image 226), a pre-processing module 228 for producing an intermediate image 230 based on the source image 226, and an encoding module 232 for producing an encoded image 214.

To begin with, in one case, the source image 226 stored in the image content store 224 can comprise any image content corresponding to information to be updated by the receiving decoding module 304. For example, in one case, the source image 226 corresponds to a region to be updated (an "update region") that is to be positioned within a region that is not to be updated (a "non-update region") in the encoded content 214. The encoding module 232 will encode this kind of image as a predictive (P) picture containing the update region (corresponding to the source image 226) and the non-update region.

In another case, the source image 226 comprises a background image. In this case, the encoding module 232 transmits the background image as an intra (I) picture (or as a predictive (P) picture containing all intra (I) macroblocks). This background image constitutes, when decoded, "wallpaper" that serves as a background against which other image content can be overlaid. For example, the decoding module 304 can overlay a source image taken from a subsequent P picture on top of the background image. Namely, the decoding module 304 will decode the subsequent P picture such that the source image taken from its update region is overlaid on the background image, and the background image is re-rendered for the portions of the P picture corresponding to its non-update region. A subsequent P picture can further effectively overlay its update region on top of the previously received P picture; this has the effect of adding incremental content to the resultant decoded image, which may include contributions from the initial I picture as well as one or more subsequent P pictures.

In any case, the source image 226 can be coded as RGB image content, YUV image content, or image content expressed in some other color space.

The pre-processing module 228 performs processing on the source image 226 to transform it into the intermediate image 230 (which serves as input to the encoding module 232). Broadly, the processing comprises resizing the source image 226 and setting the resolution of the intermediate image 230. More specifically, in operation, suppose that an application on the set-top box 204 invokes a particular user interface presentation that requires the display of the source image 226. In this case, the set-top box 204 can communicate a Source Image ID to the pre-processing module 228. The Source ID allows the pre-processing module 228 to load the source image 226 identified by the Source ID. The set-top box 204 (or other entity) can pass other control parameters to the pre-processing module 228 that govern the manner in which the source image 226 is presented within the intermediate image 230. More specifically, exemplary and non-limiting control parameters include:

Source Image ID. As mentioned, this parameter identifies the source image 226 to be processed.

Horizontal Resolution. A horizontal resolution parameter indicates the horizontal resolution of the intermediate image 230. According to one exemplary and non-limiting implementation, the horizontal resolution can comprise any integer multiple of 16 in a range from 16 to 720 pixels.

Video Mode. A video mode parameter indicates the vertical resolution of the intermediate image 230. For example, NTSC corresponds to 480 lines; PAL corresponds to 576 lines.

Position. A position parameter describes the top left corner and the bottom right corner of the source image 226 within the intermediate image 230.

As stated above, these control parameters are illustrative and exemplary; other environments can omit one or more of these parameters, or specify additional parameters. Further, in those cases in which certain properties (such as resolution) of the source image are static within a given environment, it is possible to configure one or more of the above parameters as default parameters (so that the application does not need to expressly specify these parameters).

In another case, an application on the set-top box 204 can request resources to display a page having plural source images (e.g., corresponding to plural PIP regions in the page). In this scenario, the set-top box 204 can forward control parameters (as defined above) to the pre-processing module 228 that identify each source image in the page, and that govern how the pre-processing module 228 should process each source image.

Alternatively, or in addition, it is also possible to form a collection of source images in the image content store 224 (such as 2×2 matrix of four source images). Such a collection can be encoded in a single encoded image 214 and displayed on a single application page. In this case, the encoding infrastructure 212 can pre-store some control parameters pertaining to the collection, such as control parameters which indicate the placement of source images in the collection relative to each other; this would allow the application on the set-top box 204 to simply specify the position of the collection as a whole (as if it was a single source image).

Further, as will be discussed below, various constraints can govern the placement of the source images with respect to the edges of the active video region boundaries, as well as the placement of the source images with respect to each other. The term "active video region" refers to an entire picture area associated with the intermediate image 230 (and also the encoded image 214).

Upon receipt of these control parameters, the pre-processing module 228 resizes the source image 226 in accordance with the position parameter, and also adjusts the resolution of the intermediate image 230 in accordance with the resolution parameter. The resized source image 226 within the intermediate image 230 corresponds to the update region of the encoded image 214. The remainder of the intermediate image 230 corresponds to the non-update region of the encoded image 214. As will be more fully described when discussing the encoding module 232, the encoding functionality 212 can adjust and constrain the resized source image 226 so that its edges correspond to macroblock boundaries.

According to another feature, the pre-processing module 228 assigns a non-update code to the non-update region of the intermediate image 230. This can be achieved by resizing the source image 202 over a background array that is populated with the non-update code. In one exemplary implementation, the non-update code corresponds to a non-permitted color code in the color scheme used by the encoding algorithm (in this case, MPEG-2). For example, the non-update code can correspond to 00, FF, 00 (comprising a non-permitted or "illegal" "super green" color in the RGB color space). The non-update code serves as a key which unambiguously alerts the encoding module 232 that it should generate zero MV&diff macroblocks for those regions that contain the non-update code.

If the source image 226 is intended to completely overwrite a prior picture (as with the case of a new background image), then the intermediate image 230 will contain no non-update regions, meaning that it will contain no non-update code.

Now advancing to the encoding module 232 itself, this module 232 accepts the intermediate image 230 as input. The encoding module 232 examines the intermediate image 230 to determine if it contains any non-update code. If not, then the encoding module 232 encodes the entire image as an intra (I) picture (or as a predictive picture having all intra macroblocks). If the intermediate image 230 contains at least some non-update (non-permitted) code, then the encoding module 232 will code this image as a predictive (P) picture.

More specifically, for the case of a predictive (P) picture, the purpose of the encoding module 232 is to encode all of the portions of the intermediate image 230 which bear the non-update code as non-update regions and to encode all of the portions which lack the non-update code as update regions. For example, for a given area in the intermediate picture 230, the encoding module 232 can determine whether the non-update code is present. If so, the encoding module 232 will encode this area as either a zero MV&diff macroblock or as a skipped macroblock. In either case, this coding effectively informs the decoding module 304 that this macroblock adds no new information, and that the decoding module 304 should therefore display whatever content it was previously displaying (from a previous picture) for this macroblock position. But if the area in question lacks the non-update code, then encoding module 232 codes this area as an intra (I) macroblock. The result is that the encoded image 214 contains image content that has regions that are unambiguously and automatically coded as either update content or non-update content. This provision also reduces the bandwidth of information sent to the set-top box 204, as the encoding functionality 212 need not send data for regions that do not have updatable content. This provision also consumes less set-top box memory during the processing of the image information.

The encoding module 332 has other features which allow it to perform its role as an encoder of image content. For example, the encoding module 323 can inherit the standard configuration parameters inherent to a broadcast encoder, such as horizontal resolution, mode (PAL/NTSC,) etc. The encoding module 332 can also be configured to control at least the following parameters: sequence end code; GOP header; and picture extension.

According one exemplary and non-limiting implementation, various constraints can be imposed on the encoding functionality 212 to provide a "well-behaved" encoded image 214. This better ensures that the decoding module 304 can properly interpret this encoded content 214 and render it correctly. The constraints can govern the size and shape of different image components. The constraints can also govern the placement of image components vis-à-vis other image components, with respect to the edges of the encoded image 214, and so forth. The constraints can also govern the type of image content permitted for different regions (such as by specifying the permissible color spaces, and so forth). Still other constraints are possible.

For example, in the horizontal direction, the encoding functionality 212 can require that source images be no closer than 32 pixels (two macroblocks in length) from the side edges of the encoded image 214, and no closer than 32 pixels from each other. In the vertical direction, the encoding functionality 212 can require that source images be no closer than 16 pixels (one macroblock in height) from the top or bottom edges of the encoded image 214, and no closer than 16 pixels from each other. These constraints accommodate the use of skipped macroblocks in the buffer zones (which require at least a span of two macroblocks in length).

Moreover, as another constraint, as mentioned above, the encoding functionality 212 can require that the source images have boundaries that correspond to macroblock boundaries. This, in turn, mandates (in this exemplary implementation) that the source images have sizes that are whole multiples of macroblock dimensions.

In accordance with the above constraints, the encoding module 232 can be configured to throw exceptions that are descriptive of error condition encountered when processing the intermediate images 230. The encoding functionality 212 can store error information in a log file which describes the nature of the encountered errors.

As noted above, the real-time encoding path 220 provides the encoded content 214 in dynamic fashion when it is needed by an application. In contrast, the pre-calculated encoding path 222, to be discussed next, performs the encoding tasks in advance, e.g., before an application requires the encoded content 214.

More specifically, some applications may be characterized by a set of possible output presentations which define all of the permutations of video component combinations that the applications can possibly present. For example, suppose that an exemplary VOD merchandising program can display jacket art corresponding to N products against any one of M possible backgrounds, thus yielding N×M possible permutations. This is merely illustrative, as different applications may allow more complex combination of video component combinations (as in the case where an application page can include two or more PIP images corresponding to separate source images).

In any event, an operator can, in advance, produce encoded content 214 corresponding to all of the different permutations permitted by an application. This operation can comprise manually resizing each source image onto at least one intermediate image depending on a desired placement of that source image in an application page, and also adjusting the intermediate image to so that it provides the desired resolution. In the manner described above, this manual process can also comprise coding any portions other than the source image with the non-permitted non-update color code. The non-update code informs the encoding module 232 to render these regions as either zero MV&diff macroblocks or as skipped macroblock regions. These "pre-canned" intermediate images can then be stored in an image content store 234.

When an application requires an encoded image that matches one of the intermediate image permutations in the pre-canned image content store 234, then the encoding functionality 212 can send this intermediate image to the encoding module 232. The encoding module 232 can then encode the intermediate image in the manner described above, that is, by coding portions of the image that contain the non-update code as non-update regions (zero MV&diff macroblocks or skipped macroblocks), and by coding portions that lack the non-update code as update regions (intra macroblocks).

As shown in the particular implementation of FIG. 2, the pre-calculated encoding path 222 can alternatively be simplified by producing complete encoded versions of all of the permutations required by an application. This eliminates the need for encoding intermediate images when they are required. Indeed, this would also eliminate the need to produce intermediate images in the first place. That is, the developer can construct the required encoded images from scratch so that they include either intra blocks or zero MV&diff macroblocks (without first encoding the non-update regions with the non-permitted non-update color code).

Still another mode can use a combination of the real-time processing and the pre-canned processing. For example, a developer may wish to provide pre-calculated encoded content for particularly popular application pages, and rely on dynamic processing for other, less frequently used, application pages.

The features of the encoding functionality 212 can be implemented using any technology, including, but not limited to Microsoft Corporation's DirectShow® technology (produced by Microsoft Corporation of Redmond, Wash.). In this technology, the various components can be implemented as filters which push content to other filters. Physically, the various modules can be provided by one or more server computers or other processing equipment. The data stores (224, 234) can be implemented as databases in conjunction with appropriate database management software.

As a final note, the above discussion was framed primarily in the context of displaying static images. But the same concepts can be employed for applications that display motion video. For example, an application might present a video vignette that plays as a loop rather than a static image. In operation, the pre-processing module 228 can demarcate portions of video content (on a frame by frame basis) that correspond to update regions and non-update regions by tagging the non-update regions with the special color code. And then the encoding module 232 can process these tagged images in the manner described above (on a frame by frame basis).

B. Exemplary User Interface Presentations and Associated Image Content (FIGS. 4-7)

Figure 4:
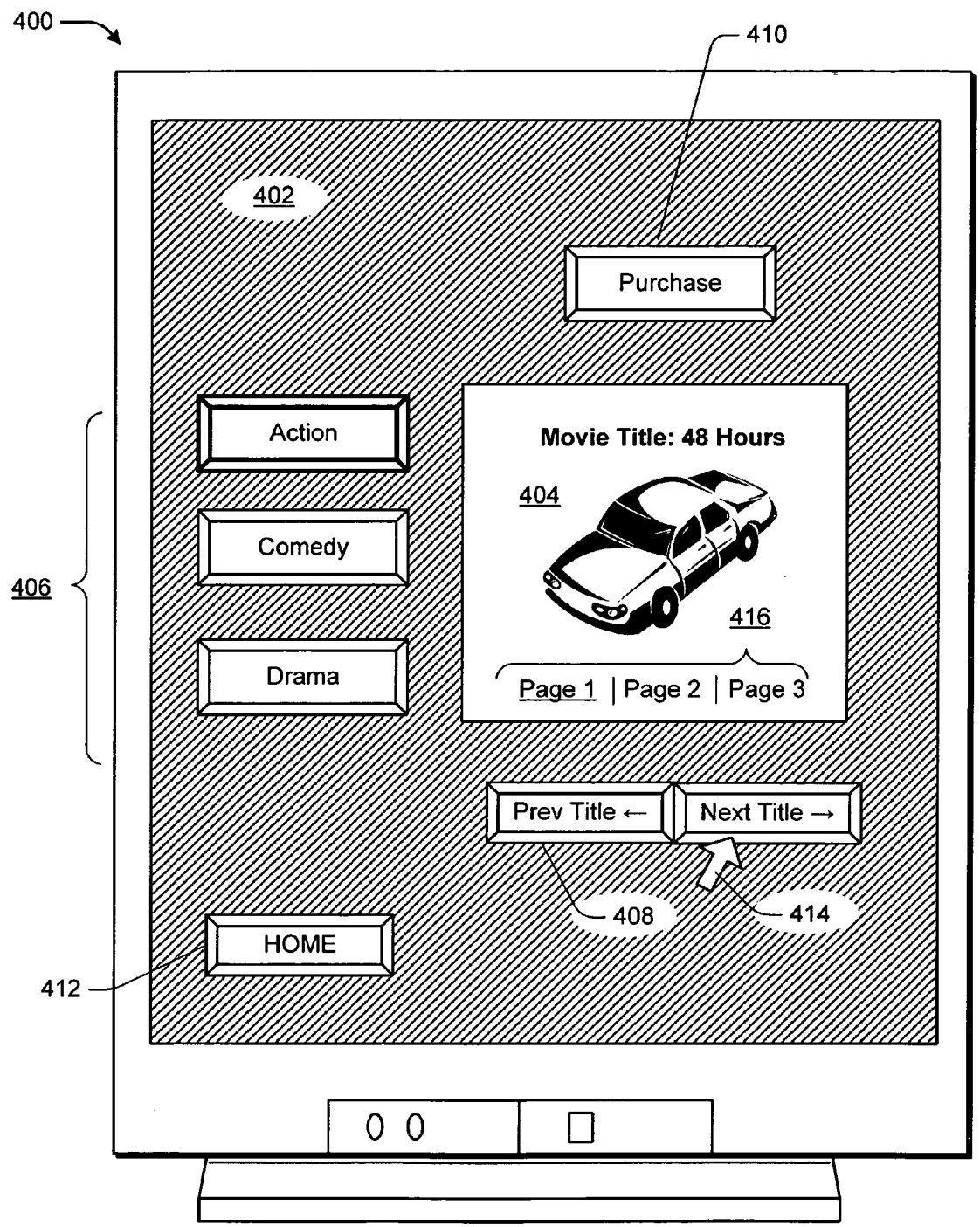
FIG. 4 shows an exemplary composite video presentation produced by the system of FIG. 2.

FIG. 4 shows an exemplary user interface presentation 400 containing a mixture of video content that can be produced by the encoding functionality 212. The user interface presentation 400 corresponds to an exemplary video on-demand (VOD) application that allows the user to browse through and select movies or other assets. Namely, the user interface presentation 400 presents one exemplary page in that VOD application. In one implementation, upon advancing to this page, the set-top box 204 can send control information to the head-end infrastructure 202 which instructs the head-end infrastructure 202 to supply the image resources required to construct this page.

The user interface presentation 400 itself include a background image 402. The background image 402 comprises a static image that may include any kind of information. It may simply comprise a solid color, a pattern; a background photograph, and so forth. For example, the background image 402 may provide a branded color and possibly a logo corresponding to an entity which provides the VOD application. A PIP image 404 is overlaid on top of the background image 402. In this exemplary case, the PIP image 404 corresponds to jacket art which describes a movie that the user might purchase.

In addition to the video components produced by the video layer, the application can also provide a number of graphics features (via its graphical layer) which allow the user to interact with the application. The graphics features shown in FIG. 4 are merely illustrative. The features include: category controls 406 which allow the user to select a category of VOD assets; a previous/next control 408 which allows the user to sequence through individual VOD assets in a particular category; a purchase control 410 which allows the user to purchase a particular selected asset; a home control 412 which allows the user to advance to a homepage; and a cursor 414 which allows the user to navigate among the various controls shown in FIG. 4. Within the PIP image 404 itself, the graphics layer can provide a page control 416 which allows the user to advance to different pages in the jacket art.

Those skilled in the art will appreciate that the selection and arrangement of parts in the user interface presentation 400 is merely illustrative and exemplary.

In operation, when the user activates the previous/next control 408 or the page control 416, the application can be configured to advance to another PIP image 404. It can perform this task in the manner described above, that is, by sending ID information to the encoding functionality 212 (along with all of the other control parameters defined above). The parameters describe the image resource that is being sought as well as the manner in which it is to be positioned, scaled, and so forth.

Although not shown in FIG. 4, any user interface presentation can present multiple PIP regions. In this case, the encoding functionality 212 can produce a P picture having multiple update regions. Further, instead of just static video content, the user interface presentation 400 can include a motion video vignette that provides a background image and/or one or more PIP images. The video vignette can be implemented as a video segment which replays in a loop.

Figure 5:
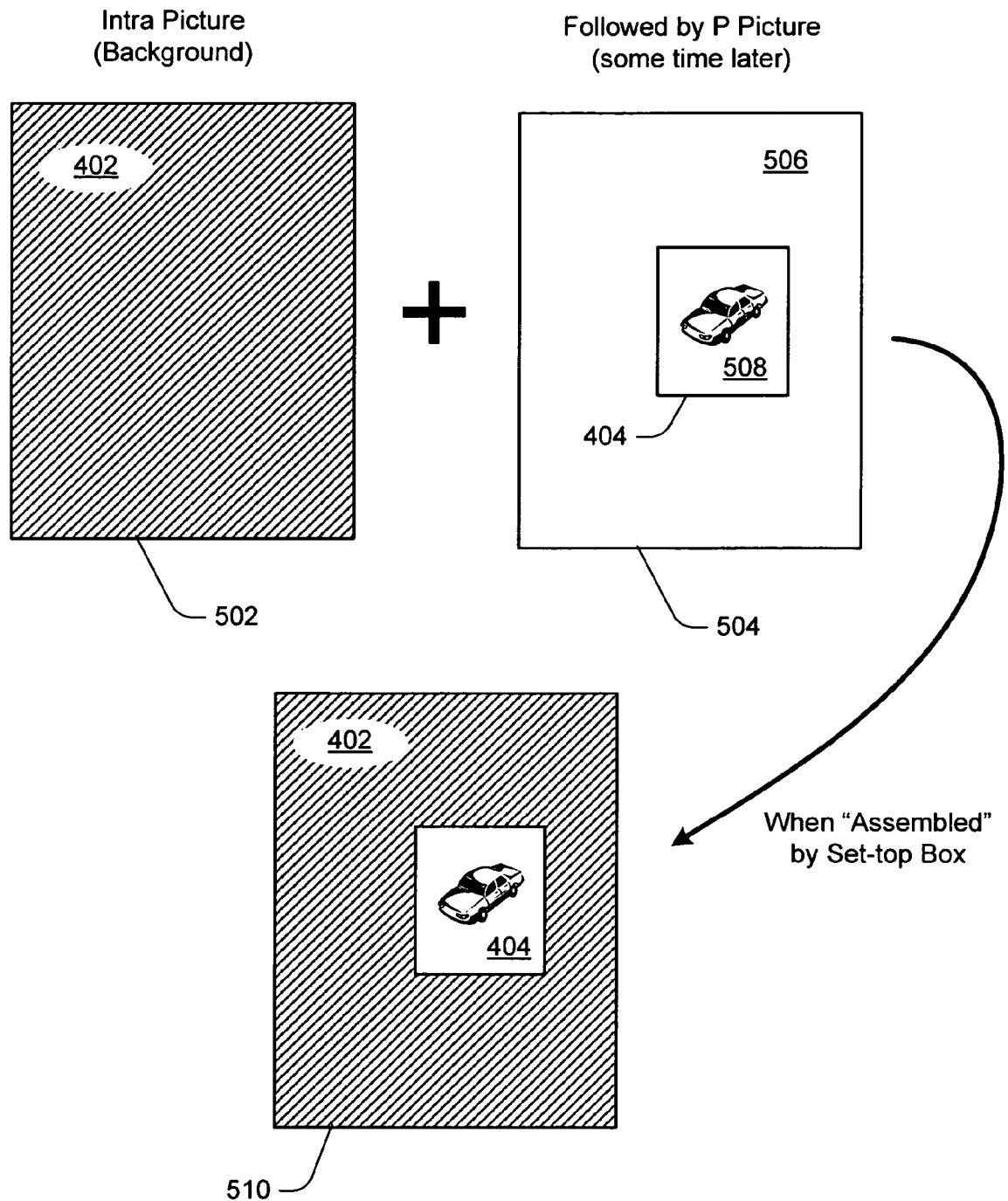
FIGS. 5-7 show exemplary image information which serves to illustrate a strategy for producing the composite presentation of FIG. 4.

Advancing to FIG. 5, this figure shows the basic manner in which the video components shown in FIG. 4 are constructed by the decoding module 304 (of FIG. 3). Namely, first, the decoding module 304 receives an intra (I) picture 502 which provides the background image 402 (or a predictive picture having all intra macroblocks). Some time later, the decoding module 232 receives a predictive (P) picture 504. The P picture 504 contains the PIP image 404. Namely, the encoding module 232 is alerted to the fact that this picture should be coded as a P picture because the intermediate image 230 used to construct the P picture includes the non-update code in it. As a result, the encoding module 232 codes the portions that are associated with the non-update code as non-update regions 506 (zero MV&diff macroblocks or skipped macroblocks) and codes the portions that are not associated with the non-update code as update regions 508 (intra macroblocks)

When the decoding module 304 receives the I picture 502, it will update all portions of the video output being displayed. This has the effect of laying down the background image 402. When the decoding module 304 receives the P picture 504, it will only update the portions of the background image 402 corresponding to the intra macroblock update region 508 within the P picture 504. This has the effect of overlaying or "pasting" the PIP image 404 onto the background image 402. In effect, this is implemented by repeat-rendering the portions of the background image 402 that correspond the non-update region 506 of the P picture 504, effectively passing these background portions "through" again. The end result is the composite video picture 510.

Figure 6:
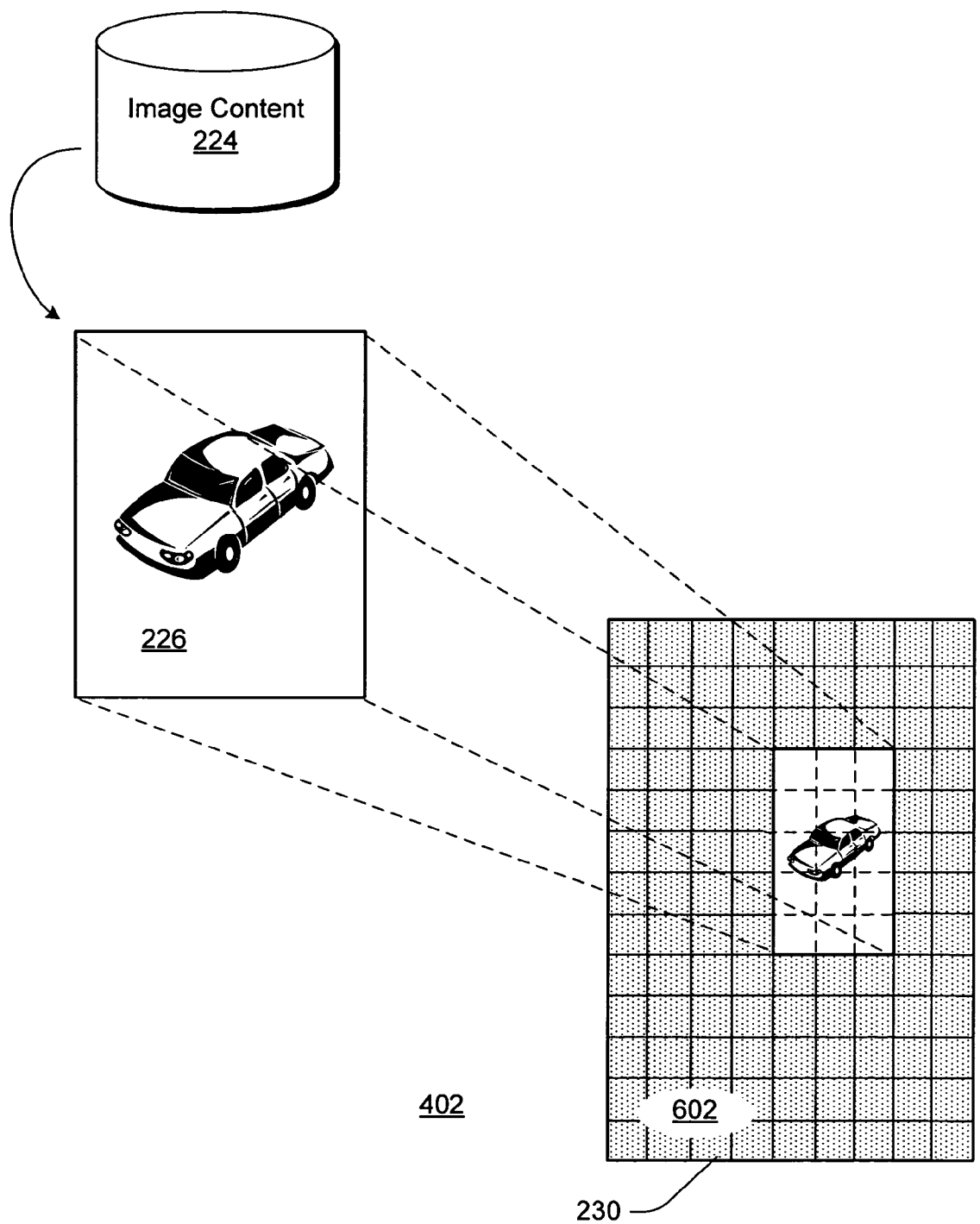

FIG. 6 provides more information regarding the role of the pre-processing module 228 in producing the P picture 504 shown in FIG. 5. Namely, the pre-processing module 228 receives the source image 226 that will constitute the PIP image 404 from the image content store 224. It then resizes the source image 226 and changes the resolution of the intermediate image 230 based on input control parameters. FIG. 6 specifically illustrates that the input source image 226 is reduced in size (relative to its original size) and the reduced size image 226 is positioned within a certain location in the intermediate image 230. Also note that, in one exemplary and non-limiting implementation, the pre-processing module 228 is constrained to adjust the size and position of the source image 226 so that its edges correspond to the boundaries of the areas that will form macroblocks in the encoded image 214 (which are illustrated as horizontal and vertical grid lines in the intermediate image 230 of FIG. 6). Other constraints may determine how close the source image 226 can be positioned with respect to the edges of the intermediate image 230 or with respect to another source image (not shown). The potions 602 surrounding the PIP image update region correspond to the non-update region. The pre-processing module 228 codes the non-update region in a non-permitted color key, such as 00, FF, 00.

Figure 7:
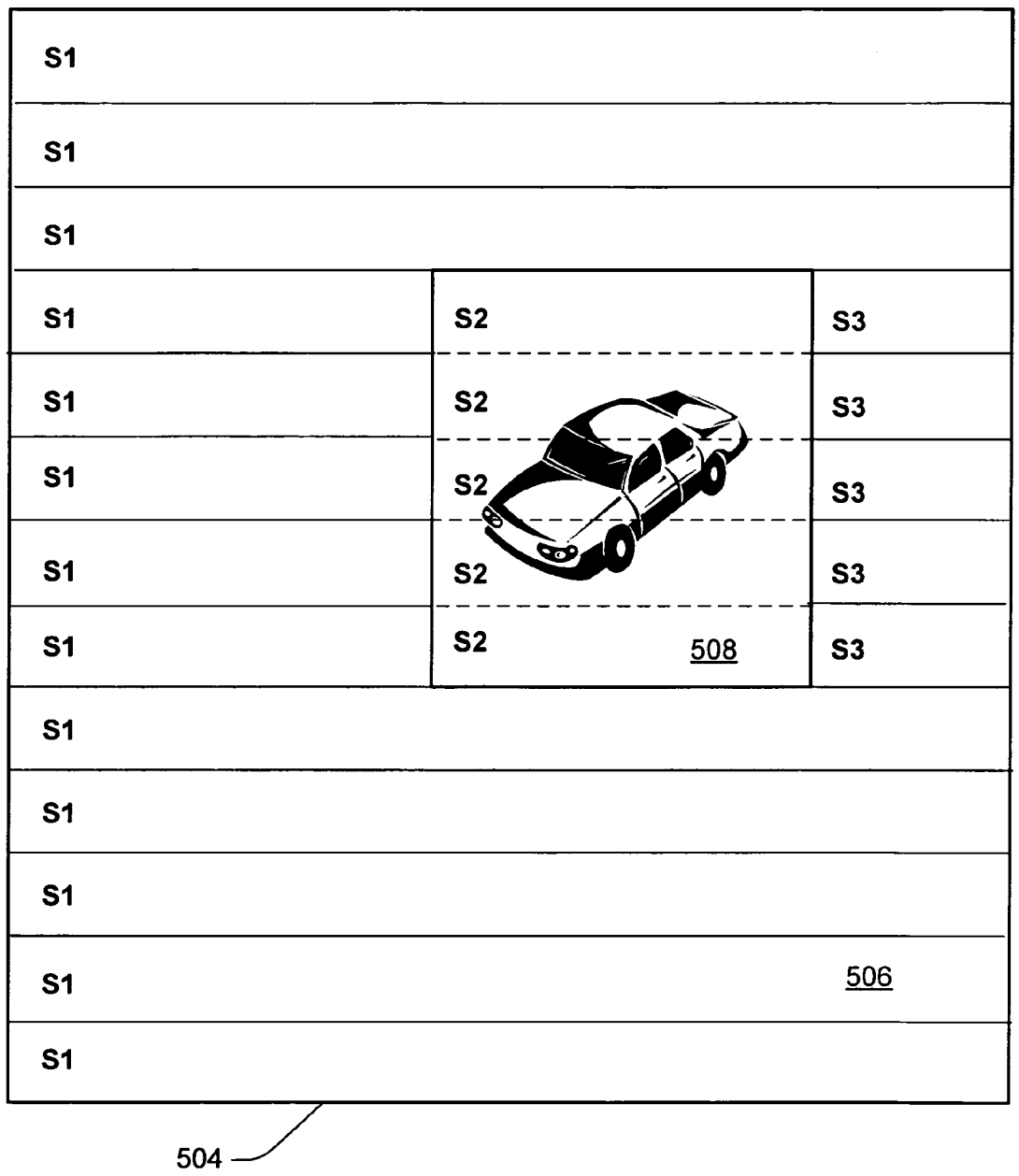

Finally, FIG. 7 shows an encoded P picture 504 produced by the encoding functionality 212. To repeat, this P picture 504 includes a non-update region 506 that is populated with zero MV&diff macroblocks (or skipped macroblocks). The P picture 504 includes an update region 508 containing intra (I) macroblocks. FIG. 7 also illustrates an exemplary manner in which the encoded P picture can be divided into a series of slices. For example, in potions that contain the P picture 504, the horizontal extent of the picture spans three strips, S1, S2, and S3. The S2 strips in the P picture 504 comprise the update region 508. The slicescan be at least two macroblocks in length to permit these regions to be optionally coded as skipped macroblocks.

C. Exemplary Method of Operation (FIGS. 8-10)

Figure 8:
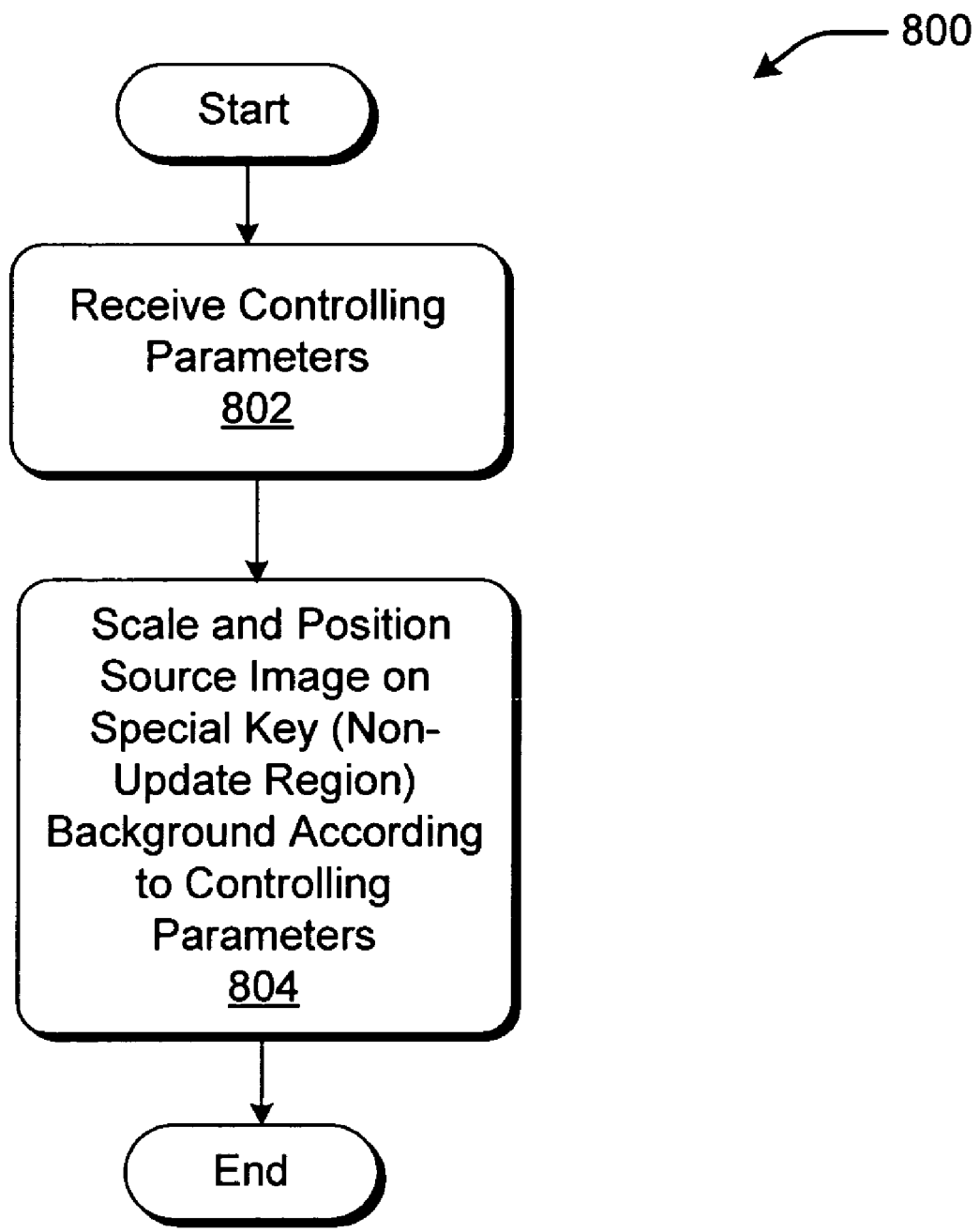
FIGS. 8-10 show exemplary procedures for producing the composite presentation of FIG. 4.
Figure 9:
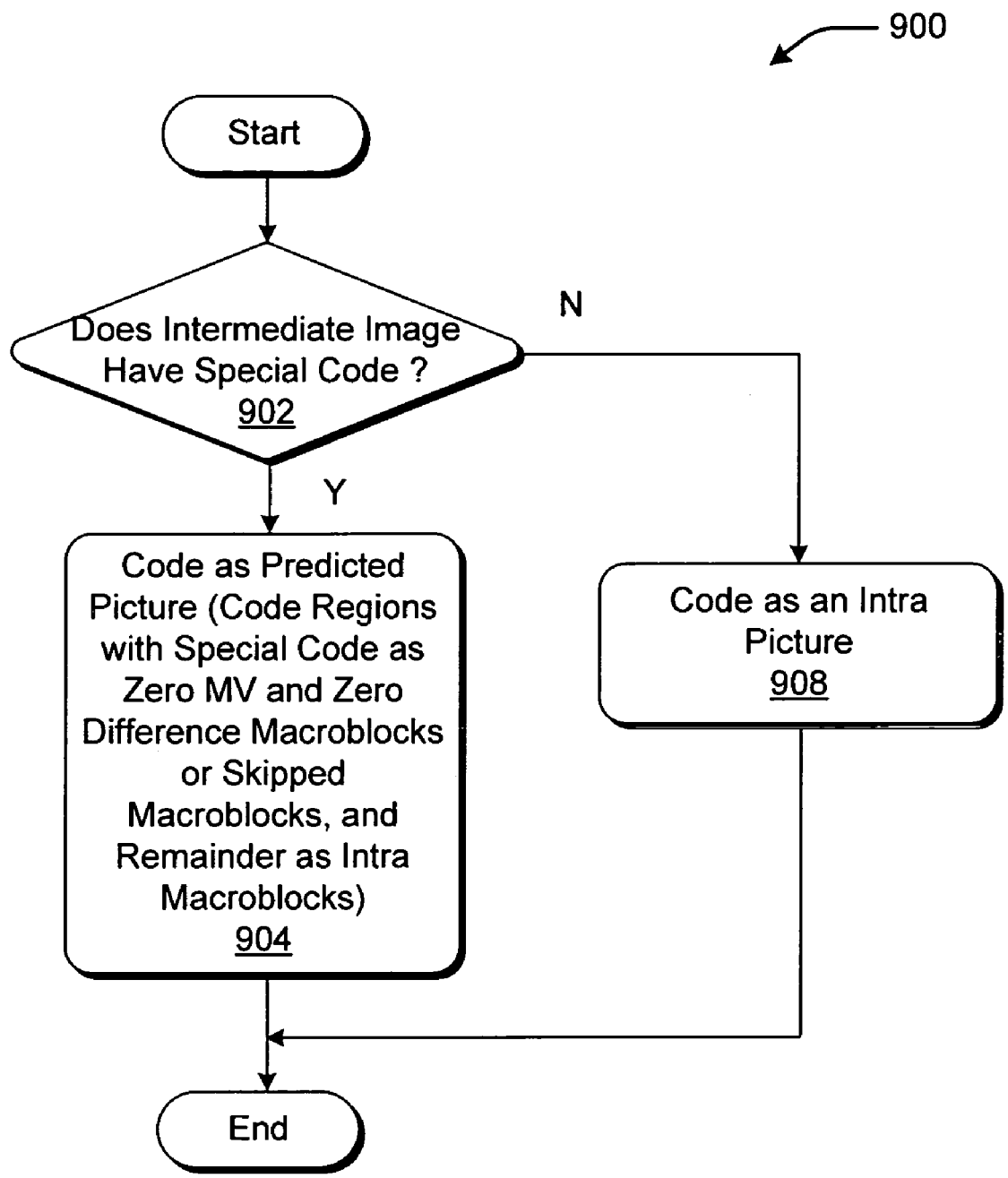
Figure 10:
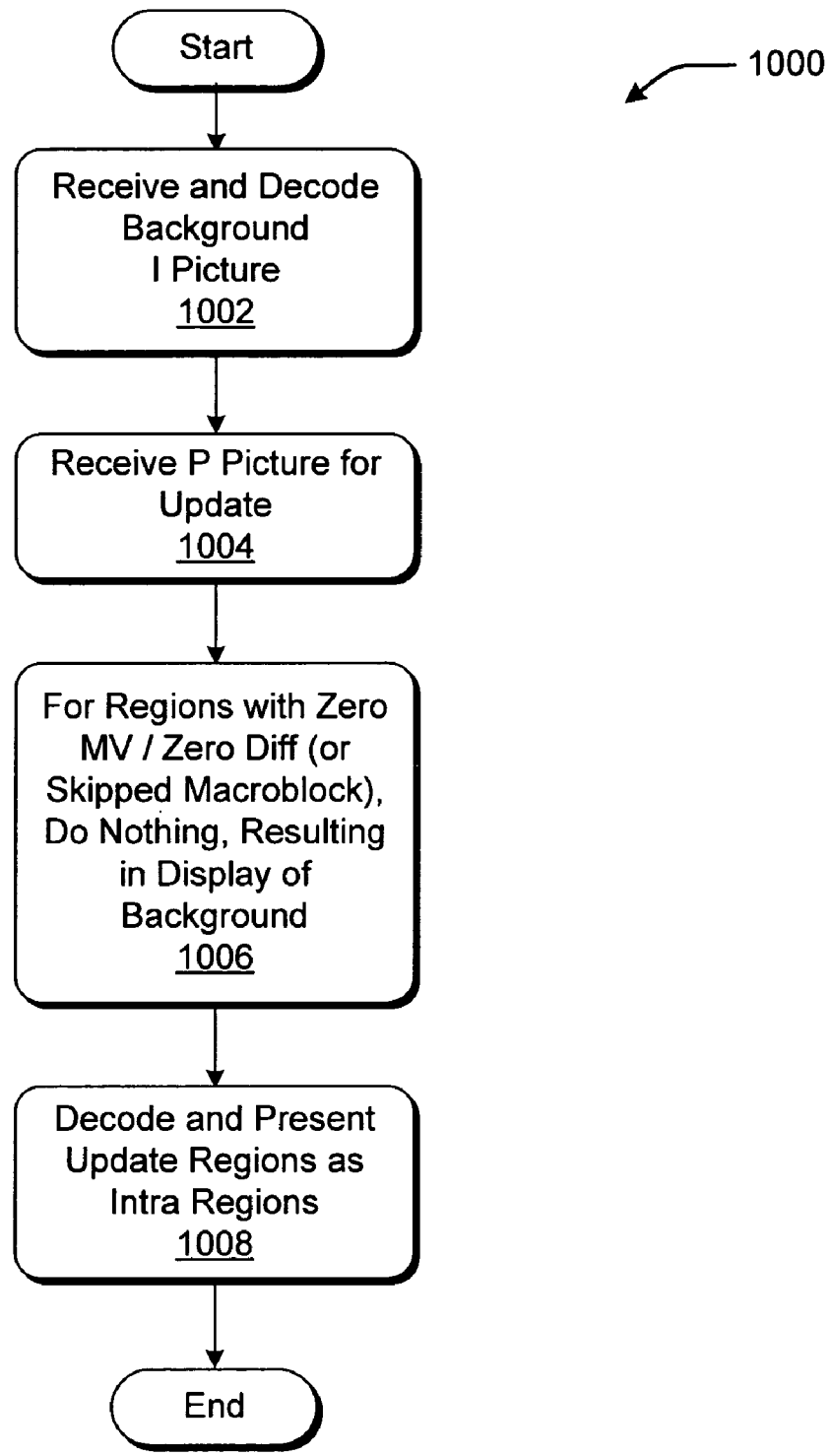

FIGS. 8-10 describe the operation of the encoding functionality 212 and the decoding module 304 in flowchart form. To facilitate discussion, certain operations are described as constituting distinct steps performed in a certain order. Such implementations are exemplary and non-limiting. Certain steps described herein can be grouped together and performed in a single operation, and certain steps can be performed in an order that differs from the order employed in the example set forth in this disclosure. As the functions described in these flowcharts have already been explained in prior sections, Section C will serve primarily as a brief review of those functions.

C.1. Pre-Processing to Produce an Intermediate Image

FIG. 8 shows a procedure 800 for performing pre-processing in the pre-processor module 228 (to produce a P picture). In step 802, the pre-processing module 228 receives control parameters from an application being run on the set-top box 204. For example, the application can request a source image 226 by specifying a Source Image ID that identifies the source image 226. The pre-processing module 228 can also receive other control parameters from the application that determine the manner in which the source image 226 is to be positioned, scaled, and so forth.

In step 804, the pre-processing module 228 responds by retrieving the requested source image 226 from the image content store 224 and processing it in the manner specified by the control parameters. For instance, the pre-processing module 228 scales and positions the source image 226 in accordance with the control parameters. The resized source image 226 is adjusted so that its edges match macroblock boundaries. Also, step 804 entails coding the non-update regions with non-permitted MPEG color codes. (Note that, if the pre-processor module 228 was processing a source image 226 for output as an I frame, then the pre-processor module 228 would not introduce any of the non-update code in the intermediate image 230).

Procedure 800 correspondence to the case where an application requests the encoding functionality 212 to construct an encoded image 214 having only one source image contained therein. However, the procedure 800 is also applicable to the case where the application requests the encoding functionality 212 to construct an encoded image 214 having plural source images contained therein.

C.2. Encoding the Intermediate Image

FIG. 9 shows a procedure 900 for performing encoding by the encoding module 232. In step 902, the encoding module 232 determines whether the intermediate image 226 includes the special non-update color code therein. If so, in step 904, the encoding module 232 produces a P picture. In that P picture, the encoding module 232 codes non-updated regions as zero MV&diff macroblocks (or skipped macroblocks), and the remainder of the P picture as intra macroblocks. If the intermediate image 230 contains no special non-update color code, then the encoding module 232 codes it as an intra (I) picture.

C.3. Consumption of Encoded Images

FIG. 10 shows a procedure 1000 for decoding a background I picture, followed by an update P picture. Namely, in step 1002, the decoding module 304 receives and decodes the background I picture. In step 1004, some time later, the decoding module 304 receives the update P picture. In steps 1006 and 1008, the decoding module 204 decodes the received P picture. This comprises, for the non-update regions (zero MV&diff macroblocks or skipped macroblock), rendering no new information, that is, by merely redundantly presenting the background I picture. In update regions, the decoding module 304 updates the presentation with the intra macroblocks contained in the P picture.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. One or more computer-readable storage medium having a stored computer program, that when executed by a processor, implement a method for producing encoded images for use by a receiving device comprising:
   providing an intermediate image; and
   producing an encoded image for use by a receiving device from the intermediate image by:
      encoding regions of the intermediate image that are marked with a predetermined key code as non-update regions; and
      encoding regions of the intermediate image that are not marked with the predetermined key code as update regions.

2. The computer-readable storage medium of claim 1, wherein the update regions are coded as intra macroblocks.

3. The computer-readable storage medium of claim 1, wherein the non-update regions are coded as zero difference and zero motion vector macroblocks.

4. The computer-readable storage medium of claim 1, wherein the non-update regions are coded as skipped macroblocks.

5. The computer-readable storage medium of claim 1, wherein the intermediate image contains at least one source image, wherein the update regions correspond to said at least one source image, and wherein the non-update regions correspond to regions other said at least one source image.

6. The computer-readable storage medium of claim 5, wherein the encoded image comprises a predictive (P) picture, and wherein the method further comprises, prior to producing the predictive P picture, providing a background intra (I) picture containing a background image, wherein the effect of decoding the background intra I picture followed by the predictive P picture is to produce a resultant picture having the source image overlaid on the background image.

7. The computer-readable storage medium of claim 5, further comprising producing the intermediate image by: receiving control parameters; retrieving said at least one source image based on the control parameters; positioning and scaling said at least one source image within the intermediate image according to the control parameters.

8. The computer-readable storage medium of claim 1, wherein the predetermined key code comprises a color code which represents a non-permitted color in a color coding scheme.

9. One or more computer-readable storage medium having a stored computer program, that when executed by a processor, implement a method for producing encoded images for use by a receiving device, comprising:
   receiving an intermediate image into a computing device;
   determining whether the intermediate image contains a predetermined key code; and
   encoding the intermediate image as an intra (I) picture if it lacks the predetermined key code, and encoding the intermediate image as a predictive (P) picture if it contains the predetermined key code.

10. The computer-readable storage medium of claim 9, wherein the encoding of the intermediate image as a predictive P picture comprises:
    encoding regions of the intermediate image that are marked with a predetermined key code as either zero motion vector and zero difference information macroblocks or as skipped macroblocks; and
    encoding regions of the intermediate image that are not marked with the predetermined key code as intra (I) macroblocks.

11. The computer-readable storage medium of claim 9, wherein the predetermined key code comprises a color code which represents a non-permitted color in a color coding scheme.

12. Encoding infrastructure for encoded images for use by a receiving device, comprising:
    an encoder comprising logic configured to:
       receive an intermediate image; and
       produce an encoded image by:
          encoding regions that contain a predetermined key code as non-update regions; and
          encoding regions that omit the predetermined key code as update regions.

13. The encoding infrastructure of claim 12, further comprising a pre-processor for producing the intermediate image, wherein the pre-processor comprises logic configured to:
    receive control parameters;
    retrieve at least one source image according to the control parameters;
    position and scale said at least one source image within intermediate image according to the control parameters; and apply the predetermined code to regions of the intermediate image other than said at least one source image.

14. The encoding functionality of claim 12, wherein the update regions are coded as intra macroblocks.

15. The encoding functionality of claim 12, wherein the non-update regions are coded as zero difference and zero motion vector macroblocks, or as skipped macroblocks.

16. The encoding functionality of claim 12, wherein the encoded image comprises a predictive (P) picture, wherein decoding the predictive P picture will have the effect of overlaying at least one source image contained in the update region of the P picture onto a background image received in a previous intra (I) picture.

17. The encoding functionality of claim 12, wherein the predetermined key code comprises a color code which represents a non-permitted color in a color coding scheme.

* * * * *